United States Patent [19]

Wenzel

[11] 4,419,029
[45] Dec. 6, 1983

[54] THREADED FASTENER

[76] Inventor: Michael Wenzel, 2251 Clinton Ave., #5, Alameda, Calif. 94501

[21] Appl. No.: 360,803

[22] Filed: Mar. 22, 1982

[51] Int. Cl.³ .................. B25G 3/00; F16G 11/00; F16D 1/00
[52] U.S. Cl. .................. 403/408; 411/409; 403/388; 403/11
[58] Field of Search ............... 403/406, 408; 411/383, 411/409, 378, 542; 224/150

[56] References Cited

U.S. PATENT DOCUMENTS 2,102,964 12/1937 Mossberg ............... 224/150 X
2,752,814 7/1956 Iaia ............... 411/542
2,798,404 7/1957 Schaefer et al. ............... 411/409

FOREIGN PATENT DOCUMENTS 573622 9/1977 U.S.S.R. ............... 403/408

Primary Examiner—Wayne L. Shedd
Attorney, Agent, or Firm—Manfred M. Warren; Robert B. Chickering; Glen R. Grunewald

[57] ABSTRACT

A threaded fastener having a self tool movable from an operable position to an out-of-the-way position which includes a threaded shaft, a laterally expanded head having a cavity beneath it surrounding the shaft, holes in either side of the expanded head, a D-ring having its opposite ends in the holes through the sides of the head, and an elastomeric ring such as an O-ring surrounding the threaded shaft and extending partly into the cavity so that when the threaded fastener is screwed into a threaded opening to receive it the O-ring is forced into the cavity when the fastener is tightened providing enough friction to hold the D-ring in its out-of-the-way position. If the object being held with the threaded fastener has a circular cavity having a diameter greater than the diameter of the D-ring, the D-ring, in its out-of-the-way position, will also lie in that recess where it will not interfere with the use of the object being held with the threaded fastener.

5 Claims, 5 Drawing Figures

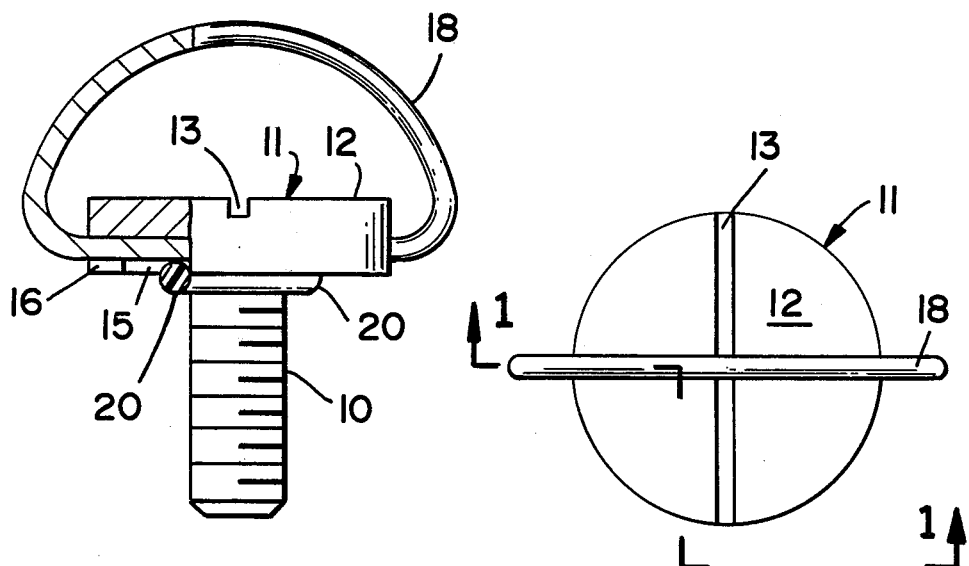
FIG_1
FIG_2
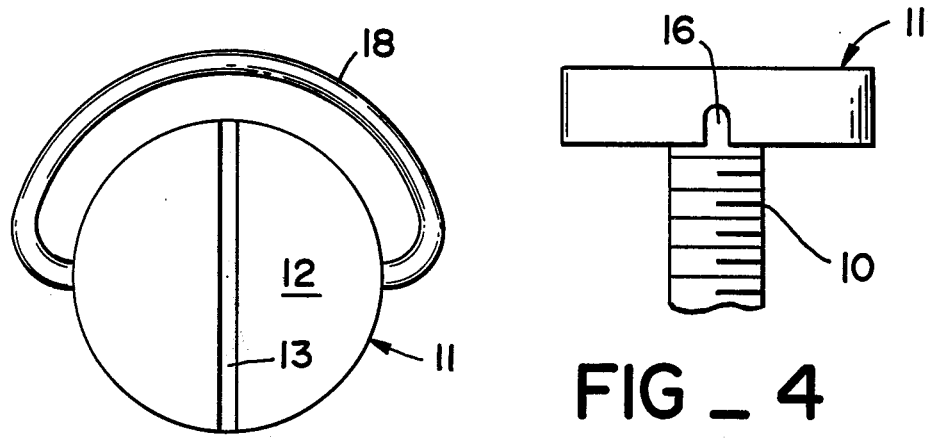
FIG_3
FIG_4
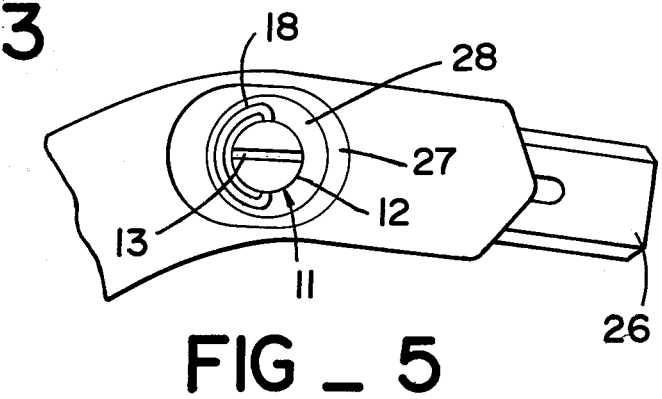
FIG_5

THREADED FASTENER

BACKGROUND OF THE INVENTION

Threaded fasteners such as screws or bolts usually require a tool such as a screwdriver or wrench to be tightened or loosened. When a threaded fastener is employed in an assembly where it is assembled and disassembled frequently, it is frequently made with a self tool. The most familiar self tool for a threaded fastener is a wing nut and it is characterized by having a threaded central area capable of receiving a bolt and two wing elements that extend far enough from the central threaded area to provide a means to grasp the nut with the fingers and enough leverage to tighten or loosen it by hand.

Most threaded fasteners having self tools are cumbersome and to some extent interfere with utility. For example, a wing nut employed with a hand tool or a rotating device presents at minimum an uncomfortable projection from the tool and frequently a dangerous, threatening surface or projection from it. A typical example of the above is a knife with a replaceable blade having a handle that is held together with a threaded fastener. Blades are replaced by separating the handle into two halves, removing the old blade from between them and inserting a new one after which the two halves are firmly held together with the blade between them by tightening the threaded fastener.

Knives of this character usually require a tool such as a screwdriver to tighten or remove the threaded fastener. Sometimes the slot in the head of the threaded fastener is wide enough to receive a large coin which provides a good enough grip and enough leverage to loosen and tighten the fastener. But whether a screwdriver or a large coin is employed some type of tool must be used.

When a knife with a replaceable blade is used by a professional such as a carpet layer or a wall board installer, blades in a replaceable blade knife must be replaced frequently. When a tool is needed to separate and reassemble such a knife it is inconvenient and time-consuming. For such knives a self tool is desired on the threaded fastener. However, the available self tool fasteners reduce the utility by interfering with the hand grip or catching on the material being worked on, for example, the nap of a shag rug.

SUMMARY OF THE INVENTION

This invention is a threaded fastener with a self tool that is movable between a work position where it is easily grasped by the fingers and a retracted position where it does not protrude above the threaded fastener and therefore presents no edge, point, or surface that could interfer with grasping the device or which could come in contact with the material being worked on.

The device of this invention includes a threaded shaft of the usual type. Although this description and the following claims are stated in terms of a threaded fastener, it is intended that the term threaded fastener be employed in its broad sense to include any fastener that is engaged and disengaged by a rotary motion. Thus, in addition to conventional threads such as are found on screws and bolts, the device of this invention includes such fasteners as bayonette fasteners.

The threaded shaft of the device of this fastener is permanently fixed to a diametrically expanded head. The head of the device of this invention preferably is expanded a greater distance than the head of an ordinary bolt or screw. The head may be provided with means for using convention tools such as a slot for a screwdriver or opposed flats for a wrench, but in the preferred embodiment the head of the device is cylindrical. The head of the device of this invention has a ring-shaped cavity surrounding the threaded shaft. The head also has two diametrically opposed openings through the cylindrical side of the head with the openings entering the cavity.

The device of this invention also includes a D-ring having its opposite ends loosely fitted in the opposed openings in the cylindrical portion of the head. Although a D-ring is the preferred embodiment of the self tool aspect of the device of this invention, it is evident that equivalents can be substituted for it. The important aspect is that the D-ring be fitted in the opposed openings in the head so that it can rotate freely around the diameter that is common to both of the diametrically opposed openings.

Finally, the device of this invention includes a ring of elastomeric material that surrounds the threaded shaft preferably being in contact with it, with the elastomeric ring being partly within the ring-shaped cavity of the head and partly outside of it. A typical elastomeric ring is the familiar O-ring, preferably one that has an inside diameter just slightly smaller than the outside diameter of the threaded shaft and a diameter of the toroidal portion that is larger than the depth of the cavity in the head of the device.

The device of this invention must be employed with a complementary threaded means such as a nut, or preferably a tapped hole in the device with which it will be used. In a preferred embodiment of the invention the device with which this invention is employed as a fastener has a recess surrounding the hole in which the threaded fastener is engaged, with that recess being slightly larger in diameter than the D-ring. In such a device, the D-ring which forms the self tool of the threaded fastener can lie in a recess when it is not employed as a tool and can be raised above the surface of the recess to be easily grasped by the fingers of an operator when it is to be employed as a tool, all as will be shown more fully hereinafter.

BRIEF DESCRIPTION OF THE DRAWINGS

FIG. 1 illustrates a device embodying this invention in partial cross-section taken along the line 1—1 in FIG. 2.

FIG. 2 is a top view of the device illustrated in FIG. 1.

FIG. 3 is a top view of the device illustrated in FIG. 1 with the self tool element in retracted position.

FIG. 4 is a left side view of the device illustrated in FIG. 1 with the D-ring self tool and the elastomeric ring removed for purposes of illustration.

FIG. 5 is a partial view of a replaceable-blade knife employing the device of this invention to maintain it in assembled condition.

DETAILED DESCRIPTION OF THE DRAWINGS

The device of this invention includes a threaded shaft 10 that is fixed to an expanded head 11. The expanded head 11 has a flat upper surface 12 which may include means for engaging a conventional tool such as the screw slot 13. The head 11 illustrated in this embodiment is cylindrical in shape and it has a cavity 15 formed on the underside of it. The cavity 15 is ring shaped and surrounds the threaded shaft 10.

The head 11 also includes diametrically opposed openings 16 which open through the cylindrical surface of head 11 into the cavity 15. The device of this invention also includes a D-ring 18 having its opposite ends on the same axis and with each of its opposite ends being in an opposing hole 16. The wire from which D-ring 18 is made is slightly smaller in diameter than the width of hole 16 so that the D-ring fits loosely within hole 16 and therefore is free to rotate easily between a position of the D-ring such as is shown in FIG. 1 and a position of the D-ring, for example, as is shown in FIG. 3.

The final element employed in the device illustrated in FIG. 1 is an elastomeric ring 20 which is illustrated in this embodiment as a familiar O-ring. The ring 20 is shown as a preferred embodiment of the invention wherein it is in contact with the threaded shaft 10 and is large enough toroidal diameter to be partly within and partly without of the cavity 15.

In use, in the position illustrated in FIG. 1, D-ring 18 rotates freely within openings 16. However, when threaded fastener 10 is screwed into a complementary threaded means and the device of this invention is set to hold elements firmly together, ring 20 will encounter a surface of the device with which the fastener of this invention is employed, will be forced into cavity 15, will deform to become flat, and will bear against the ends of D-ring 18 with sufficient force to make its rotation within openings 16 very difficult. When the device of this invention is screwed tightly into its complementary threaded means and ring 20 is crushed, D-ring 18 in the position illustrated in FIG. 3 will be held firmly enough in place so that it will not be moved by gravity or centrifical force but it will still be moved easily by force applied, for example, with a workman's finger. The first loosening motion of the D-ring, of course, will release substantially all of the friction caused by elastomeric ring 20 so that it can be easily manipulated into any position for loosening or tightening the threaded fastener.

FIG. 5 illustrates the device of this invention in actual use in a typical embodiment. The embodiment of FIG. 5 shows the device of this invention where it is holding together two halves of a handle of a knife that has replaceable blades. The handle 25 is shown partially. The end of the handle holding blade 26 is illustrated whereas the portion of the handle that is grasped by the hand of a workman is not illustrated.

The handle has a recess having sloped walls 27 and a flat bottom portion 28. The recess is deep enough to have D-ring 18 completely contained within it and the diameter of the flat bottom 28 is slightly greater than the maximum diameter of D-ring 18. In the position shown in FIG. 5, D-ring 18 is below the major surface of knife handle 25. Preferably head 11 is also completely contained within the recess, however, if head 11 protrudes a small amount above the recess it will not interfere with the operation of a knife because there are no sharp corners on head 11 and because it can be made smooth enough to not be uncomfortable when it comes in contact with a worker's hand.

When the device of this invention is screwed in to hold both halves of the knife firmly together, elastomeric ring 20 (which is not shown in this illustration) will be squashed against surface 28, compressed into recess 15 and it will bear strongly against the ends of D-ring 18 that are within recess 15. Thus, it will take more force to raise D-ring 18 than is normally encountered in working with the knife. However, a worker can put his fingernail between surface 28 and D-ring 18 and easily raise D-ring to be perpendicular to the plane of upper surface 12 so that it can easily be manipulated with the hand to unscrew the threaded fastener so that the two halves of handle 25 can be separated to replace blade 26.

What is claimed is:

1. A threaded fastener comprising a threaded shaft, a laterally expanded head connected to one end of the shaft with said head having a ring-shaped cavity surrounding the threaded shaft and two diametrically opposed openings through the side of said head and into said cavity, a D-ring having opposed ends loosely fitting in said opposed openings, and an elastomeric ring surrounding the threaded shaft and lying partly within said ring-shaped cavity.

2. The fastener of claim 1 wherein said elastomeric ring is an O-ring.

3. The fastener of claim 1 wherein said expanded head is cylindrical.

4. The fastener of claim 1 wherein said expanded head is provided with a slot to receive a screwdriver.

5. A device comprising two pieces adapted to be held together with a threaded fastener, including a first piece having threaded means to engage the threaded fastener and a second piece having a hole through which the threaded fastener extends, said device including a threaded fastener comprising a threaded shaft, a laterally expanded head connected to one end of the shaft, said head having a ring-shaped cavity surrounding the threaded shaft and two diametrically opposed openings through the side of said head and into said cavity, a D-ring having opposing ends loosely fitted in said opposed openings, an elastomeric ring surrounding the threaded shaft partly within said ring-shaped cavity, a recess in said first piece having a diameter greater than the diameter of said D-ring and deeper than said ring-shaped cavity.

* * * * *